(12) United States Patent
Handler

(10) Patent No.: US 8,350,525 B2
(45) Date of Patent: Jan. 8, 2013

(54) CHARGING VEHICLES IN A PARKING AREA

(75) Inventor: Bradley A. Handler, Palo Alto, CA (US)

(73) Assignee: Credit Lock, LLC, Denver, CO (US)

( * ) Notice: Subject to any disclaimer, the term of this patent is extended or adjusted under 35 U.S.C. 154(b) by 561 days.

(21) Appl. No.: 12/536,212

(22) Filed: Aug. 5, 2009

(65) Prior Publication Data

US 2011/0035261 A1  Feb. 10, 2011

(51) Int. Cl.
*G06Q 99/00* (2006.01)
(52) U.S. Cl. .......................................... 320/109; 705/39
(58) Field of Classification Search .............. 320/109; 705/39
See application file for complete search history.

(56) References Cited

U.S. PATENT DOCUMENTS

2008/0281663 A1* 11/2008 Hakim et al. ................ 705/8
2010/0156349 A1*  6/2010 Littrell ........................ 320/109

* cited by examiner

*Primary Examiner* — Akiba Allen
(74) *Attorney, Agent, or Firm* — Schwegman Lundberg Woessner P.A.

(57) ABSTRACT

Methods and systems for charging vehicles in a parking area are described. In one embodiment, a charge request may be received for a vehicle located in a parking area. The vehicle may have a power connection with a power source. An electric charge is provided through the power connection from the power source to the vehicle based on receiving the charge request. Payment is recorded for providing the electric charge based upon departure of the vehicle from the parking area. Additional methods and systems are disclosed.

13 Claims, 6 Drawing Sheets

CHARGING VEHICLES IN A PARKING AREA

TECHNICAL FIELD

This application relates to methods and systems for charging electric vehicles and, more specifically, to methods and systems for charging electric vehicles in a public parking area.

BACKGROUND

An electric vehicle may have a limited range based on the amount of electric charge contained in its battery. The battery for the electric vehicle is typically charged at the home of a user of the electric vehicle.

DETAILED DESCRIPTION

The description that follows includes illustrative structures, methods, materials, and techniques that embody the present disclosure. In the following description, for purposes of explanation, numerous specific details are set forth to provide an understanding of various embodiments of the inventive subject matter. It will be evident, however, to those skilled in the art that embodiments of the inventive subject matter may be practiced without these specific details. Further, independently well-known structures, methods, materials, protocols, and techniques have not been shown in detail.

As used herein, the term "or" may be construed in an inclusive or exclusive sense. Similarly, the term "exemplary" may be construed merely to mean an example of something or an exemplar and not necessarily a preferred means of accomplishing a goal. Additionally, although various exemplary embodiments discussed below focus on various embodiments related to charging electric vehicles in a parking area, the embodiments are merely given for clarity in disclosure. Thus, any type of related electrical charging system for vehicles, in general, is considered as being within a scope of the present disclosure.

Thus, exemplary methods and systems for charging vehicles in a parking area are generally described herein. In the following description, for purposes of explanation, numerous specific details are set forth in order to provide a thorough understanding of the exemplary embodiments. It will be evident, however, to one of ordinary skill in the art, that embodiments of the present invention may be practiced without these specific details.

Electronic cars and other electric or hybrid vehicles may receive an electric charge while in a parking space in a parking lot. A user of a vehicle is assessed a fee when the vehicle departs from the parking lot. Payment of the fee is made through an energy account of the user.

Figure 1:
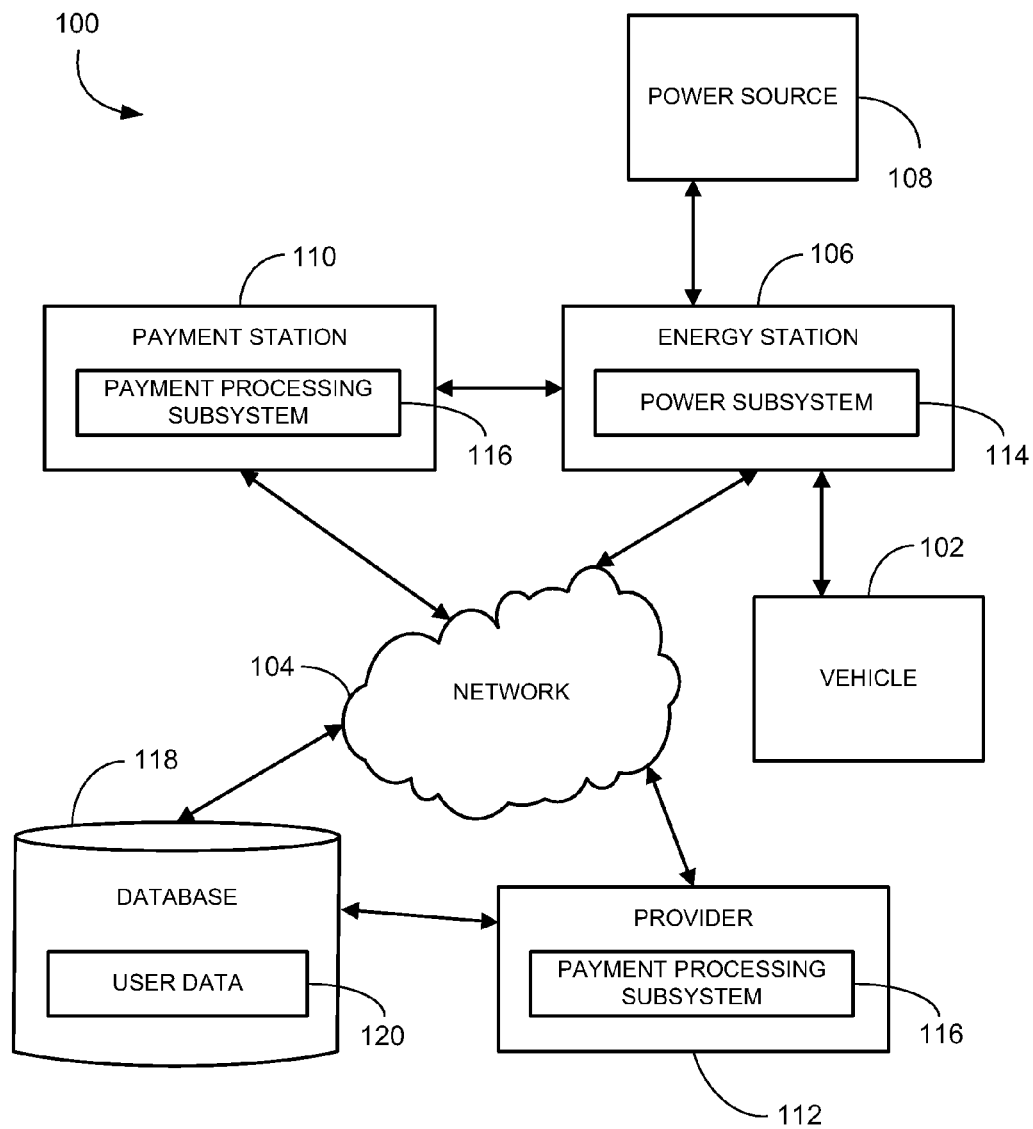
FIG. 1 is a block diagram of a system for charging a vehicle in a parking area, according to an exemplary embodiment.

FIG. 1 illustrates an exemplary system 100 in which a vehicle 102 in a parking area (e.g., a parking lot) is powered by an energy station 106. The vehicle 102 may be an electric vehicle, a hybrid motor vehicle, an electric bicycle, an electric motorcycle, a hybrid motorcycle, an electric golf cart, a hybrid golf cart, or the like. The vehicle may be any alternative non-gasoline vehicle. The energy station 106 may provide an electric charge through a power connection from a power source 108 to the vehicle 102. The energy is received by the power source 108 from solar panels, from burning natural gas, from burning coal, through the use of wind turbines, or the like.

The parking area may be an area which is not adjacent to a dwelling of the user of the vehicle 102 where the user may seek a charge for the vehicle 102. For example, the parking area may be at a place of employment of the user, at a place of amusement (e.g., a sporting venue), or the like.

A payment station 110 or a provider 112 is used to process payments for providing an electric charge to the vehicle 102. The payment is processed by adjusting a value of an energy account, receiving a portion of the amount due from funds associated with a pre-paid card, or otherwise is received. The energy station 106 and the payment station 110 may be separate devices or integrated into a unitary device. The provider 112 may operate on a computer system maintained or controlled by a business entity. The business entity may maintain control over multiple payment stations 110, may manage a parking lot in which the vehicle 102 is located, or otherwise is associated with the provider 112.

A network 104 over which the energy station 106, the payment station 110, or the provider 112 communicate, may include a Global System for Mobile Communications (GSM) network, an Internet Protocol (IP) network, a Wireless Application Protocol (WAP) network, a WiFi network, or an IEEE 802.11 standards-based network, as well as various combinations thereof. Other conventional or later developed wired and wireless networks may also be used.

The provider 112 may also be in communication with a database 118. The database 118 stores user data 120 which may include information regarding users of the provider 112.

A power subsystem 114 is deployed in the energy station 106. The power subsystem 114 establishes a power connection with the vehicle 102 located in a parking area, receive a charge request for the vehicle 102, provide an electric charge through the power connection from the power source 108 to the vehicle 102 based on receiving the charge request, and record payment for providing the electric charge based upon departure of the vehicle 102 from the parking area.

A payment processing subsystem 116 is deployed in the payment station 110 or the provider 112. The payment processing subsystem 116 establishes an energy account for a user, associates an energy account identifier with the energy account, receives a payment request for providing an electric charge to the vehicle 102, and adjusts a value of the energy account based on receiving the charge request.

In an exemplary embodiment, the vehicle 102 provides power back to the energy station 106. The return of the power may provide a user of the vehicle 102 with credits. For example, a threshold amount of power may be left with the vehicle 102 to enable to the vehicle 102 to return to a user's home.

In an exemplary embodiment, the payment station 110 may include a communicator instead of, or in addition to, a display to provide information to a portable or other type of device associated with the user of the vehicle 102. For example, information regarding the payment is provided via radio frequency (RF) to the portable device of the user.

Figure 2:
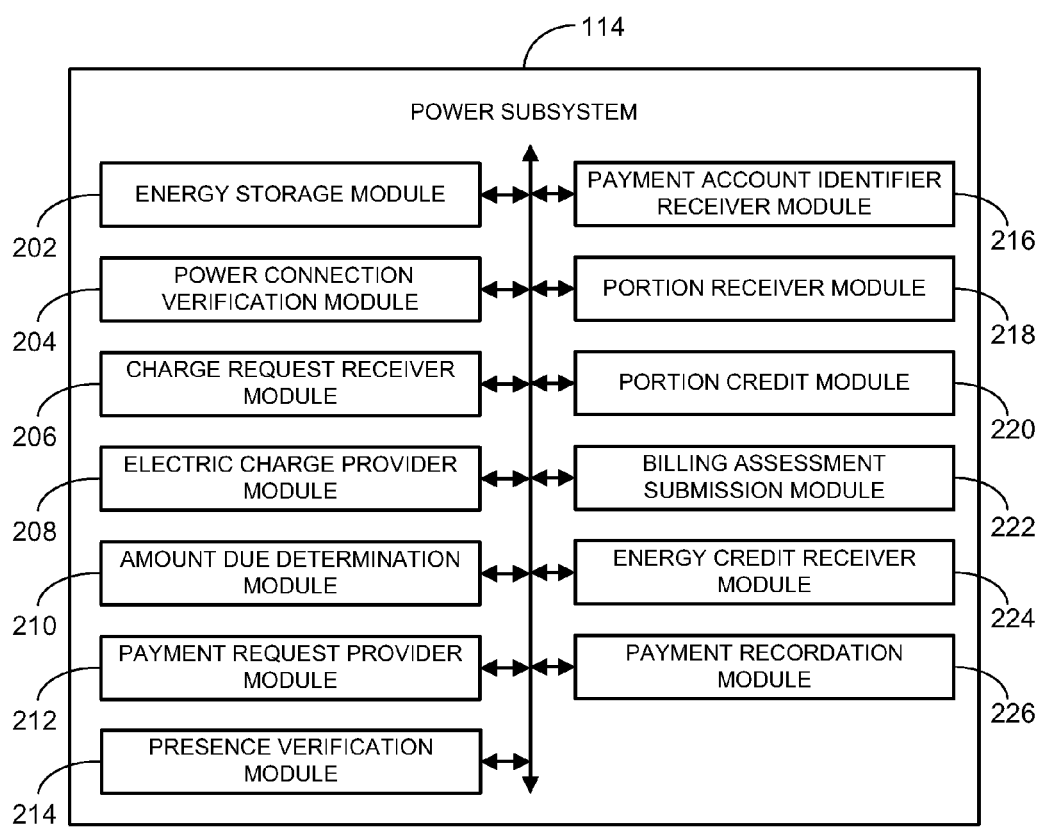
FIG. 2 is a block diagram of a power subsystem that may be deployed within the system of FIG. 1, according to an exemplary embodiment.

With reference to FIG. 2, and continuing reference to FIG. 1, an exemplary embodiment of the power subsystem 114 deployed within the energy station 106 of the system 100 is illustrated. The power subsystem 114 may include an energy storage module 202, a power connection verification module 204, a charge request receiver module 206, an electric charge provider module 208, an amount due determination module 210, a payment request provider module 212, a presence verification module 214, a payment account identifier receiver module 216, a portion receiver module 218, a portion credit module 220, a billing assessment submission module 222, an energy credit receiver module 224, and a payment recordation module 226. Other modules may also be included.

To provide power to the vehicle 102, in some embodiments, energy is stored at the power source 108 (FIG. 1) by the energy storage module 202. The energy is received from solar panels, from burning natural gas, from burning coal, through the use of wind turbines, or the like, each known independently in the art.

Once a power connection is made to the vehicle 102, in some embodiments verification that the power connection has been made with the vehicle 102 located in a parking area is made by the power connection verification module 204.

A charge request for the vehicle 102 is then received by the charge request receiver module 206. The request is made based on the connection of the vehicle 102 to the power source 108, by a user through a user interface at the payment station 110, the power source 108, or otherwise is made. An electric charge is then provided through the power connection from the power source 108 to the vehicle 102 by the electric charge provider module 208.

An amount due for providing the electric charge is determined by the amount due determination module 210. A payment request for the amount due may be provided to the operator of the vehicle 102 by the payment request provider module 212.

In some embodiments, verification of the presence of a user associated with the vehicle 102 (e.g., an operation) at a particular location is made by the presence verification module 214. In some embodiments, a payment account identifier is received by the payment account identifier receiver module 216 from the user associated with the vehicle 102. The presence verification module 214, the payment account identifier receiver module 216, or both, may in some embodiments be used for making payment.

A portion of the amount due may be received by the portion receiver module 218 the user associated with the vehicle 102 from funds associated with a pre-paid card, or both. A portion of the amount due to an entity associated with the parking area may be credited by the portion credit module 220.

In some embodiments, a billing assessment for the payment account identifier is submitted and a response to the submission of the billing assessment is received by the billing assessment submission module 222. In some embodiments, when a pre-paid energy card is used, an energy credit associated with the pre-paid energy card is received by the energy credit receiver module 224.

Payment for providing the electric charge based upon departure of the vehicle 102 from the parking area is recorded by the payment recordation module 226. The recordation of the payment is based on the amount due, receipt of the payment account identifier, receipt of the portion, receipt of the funds, credit of the portion, receipt of the response, receipt of the energy credit, or verification the presence.

Figure 3:
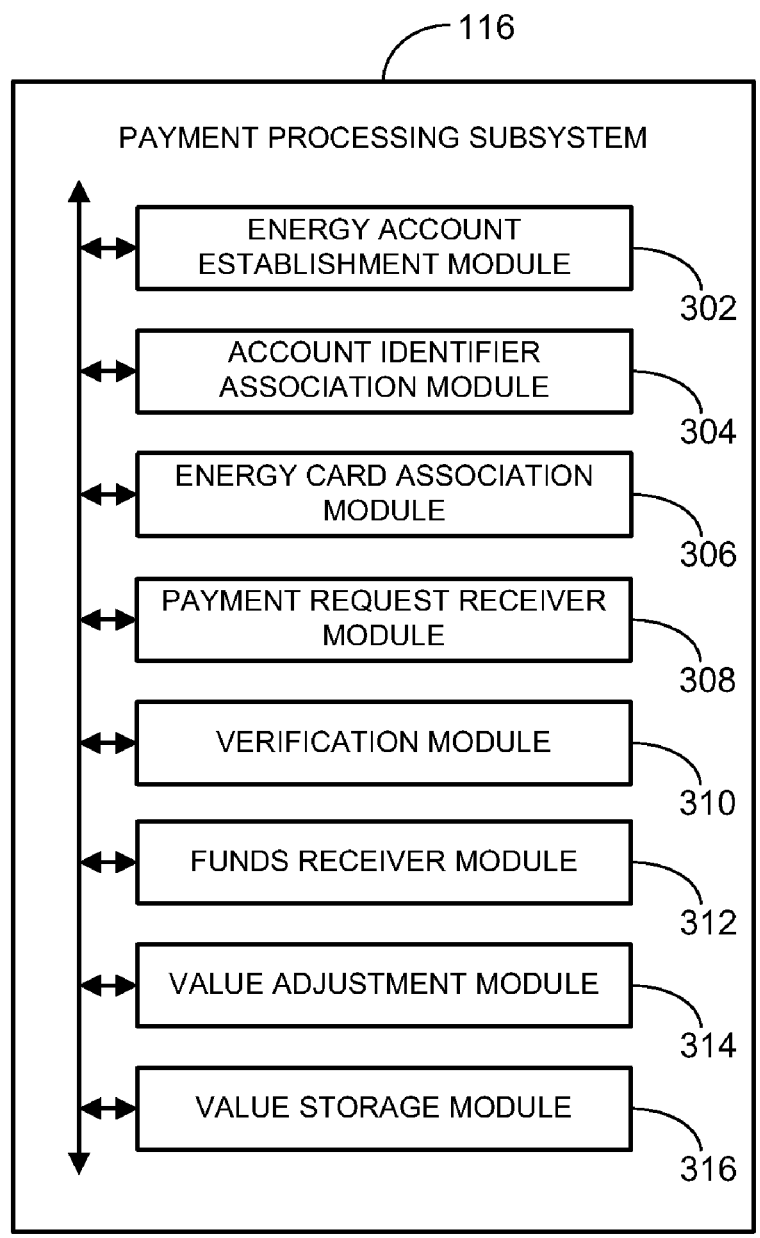
FIG. 3 is a block diagram of a payment processing subsystem that may be deployed within the system of FIG. 1, according to an exemplary embodiment.

Referring now to FIG. 3, and with continuing reference to FIG. 1, an exemplary payment processing subsystem 116 is illustrated that may be deployed in the payment station 110 or the provider 112 of the system 100 or otherwise deployed in another system. The payment processing subsystem 116 may include an energy account establishment module 302, an account identifier association module 304, an energy card association module 306, a payment request receiver module 308, a verification module 310, a funds receiver module 312, a value adjustment module 314, or a value storage module 316. In various exemplary embodiments, the modules may be distributed so that some of the modules may be deployed in the payment station 110 and some of the modules may be deployed in the provider 112.

Other modules may also be included. By way of example and with reference again to FIG. 2, the amount due determination module 210, the payment account identifier receiver module 216, the portion receiver module 218, the portion credit module 220, the billing assessment submission module 222, the energy credit receiver module 224, or the payment recordation module 226 may be included in the payment processing subsystem 116.

Referring again to FIG. 3, an energy account is established for the operator of the vehicle 102 by an energy account establishment module 302. Once the energy account is established, an account identifier association module 304 associates an energy account identifier with the energy account. An energy card may be associated with the energy account identifier by the energy card association module 306.

To pay for an electric charge provided to the vehicle 102, a payment request is received by a payment request receiver module 308. In some embodiments, the payment request includes the energy account identifier. Verification that the energy account is associated with the vehicle 102 is performed by a verification module 310. Funds for the energy account are received by a funds receiver module 312.

Value adjustments to the value of the energy account based on receiving the charge request, receiving the funds, a vehicle type of the vehicle 102, or a power basis of the vehicle 102, is performed by a value adjustment module 314. The value of the energy account is then stored on the energy card by a value storage module 316.

Figure 4:
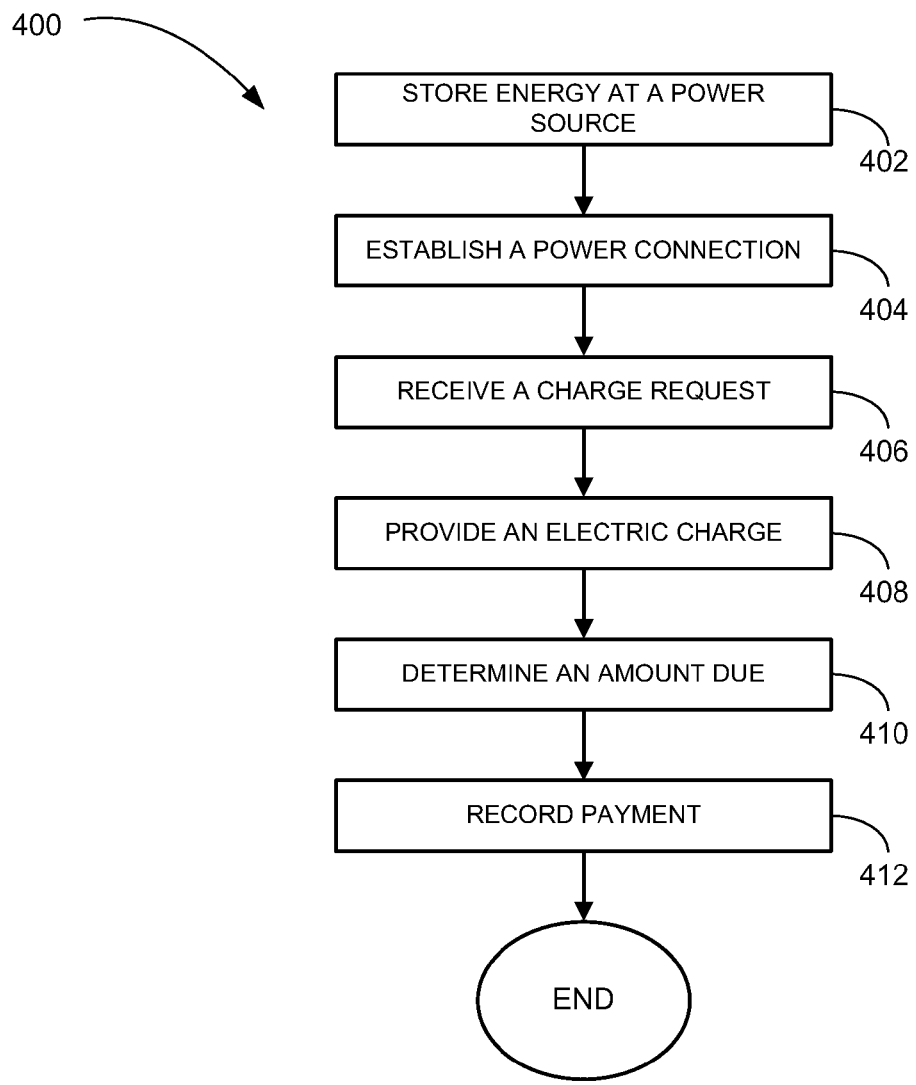
FIG. 4 is a flowchart illustrating a method of providing power, according to an exemplary embodiment.

FIG. 4 illustrates a method 400 for providing power, according to an exemplary embodiment. The method 400 is performed by the energy station 106 of the system 100 (see FIG. 1), or may otherwise be performed.

In some embodiments, to provide energy at the energy station 106, energy is first stored at the power source 108 at operation 402. In an exemplary embodiment, the stored energy is received from solar panels. In another exemplary embodiment, the stored energy is received from burning natural gas. In yet another exemplary embodiment, the stored energy is received from burning coal. In still another exemplary embodiment, the stored energy is received through the use of wind turbines.

When an operator of the vehicle 102 seeks to receive a charge, a power connection is established between the vehicle 102 and the energy station located in a parking area at operation 404. The vehicle 102 can be an electric vehicle, a hybrid vehicle, an electric bicycle, an electric motorcycle, a hybrid motorcycle, an electric golf cart, a hybrid golf cart, or the like. The power connection is established with the vehicle 102 located in a parking space among one or more parking spaces in the parking area. In an exemplary embodiment, the power connection is established through a Tesla tip (known independently in the art and standardized under American National Standards Institute (ANSI)). In another exemplary embodiment, the power connection is established through a different type of tip that is capable of providing power.

A charge request for the vehicle 102 is then received at operation 406 to charge the vehicle. The charge request may include a payment amount, charge duration, charge start time, charge finish time, voltage, or the like. After receiving the charge request, an electric charge is provided through the power connection from the power source 108 to the vehicle 102 at operation 408.

An amount due for providing the electric charge may be determined at operation 410. In one embodiment, a portion of the amount due is received from a user associated with the vehicle 102 (e.g., an operator). The portion is either an entire portion or a partial portion.

In another embodiment, a portion of the amount due at operation 410 is received from funds associated with a pre-paid card. The pre-paid card may be, by way of example, a pre-paid credit card, a pre-paid debit card, or the like. The portion may be received at the energy station 106, a payment station, or the like.

In one embodiment, a payment account identifier is received from a user associated with the vehicle 102, a billing assessment for the payment account identifier is submitted (e.g., to the user), and a response to the submission of the assessment is received. The response typically includes payment, a payment source, or the like. In yet another embodiment, energy credit associated with a pre-paid energy card is received for payment. In some embodiments, a payment request for the amount due is provided to an operator of the vehicle 102 during operation 410.

At operation 412, payment for providing the electric charge is recorded. The recordation may include directly recording the payment, sending notice to the provider 112 to record the payment, or both.

In one embodiment, departure notification that the vehicle 102 is departing the parking area is received and payment for providing the electric charge is then recorded. In one embodiment, the departure notification is provided in the form of an entrance/exit ticket by the operator of the vehicle 102 to the operator of the parking lot.

In another embodiment, the departure of the vehicle 102 from the parking area is detected and the payment for the providing of the electric charge is recorded. The departure is detected based on, for example, a radio-frequency identification (RFID) card, another type of card with an identifier, or the like.

In another embodiment, a portion of the amount due from an entity associated with the parking area is credited. The credit may be based on the user's activity. For example, the user may have made a purchase in the store of the entity, visited a store of the entity, or the like. The credit may then offset the amount due determined during the operation 410 and for which payment is recorded at operation 412.

In another embodiment, presence of a user associated with the vehicle 102 at a particular location is verified. In one embodiment, the presence is verified by mobile phone. In another embodiment, the presence is verified by RFID. The payment is then recorded based on the presence of the user.

Figure 5:
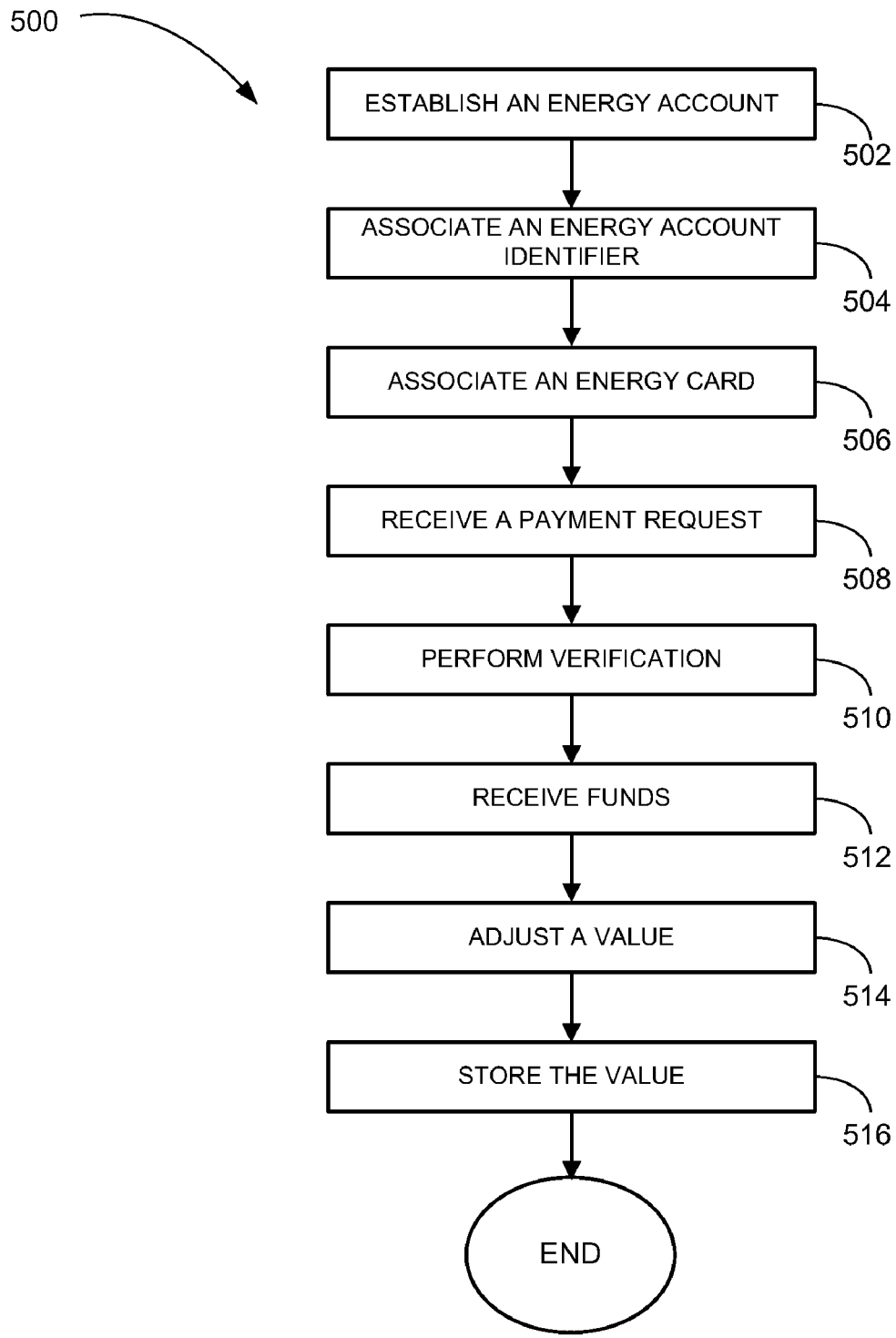
FIG. 5 is a flowchart illustrating a method for payment processing, according to an exemplary embodiment.

FIG. 5 illustrates a method 500 for payment processing, according to an exemplary embodiment. The method 500 may be performed by the payment station 110 or the provider 112 associated with the system 100 (see FIG. 1).

An energy account is established for a user at operation 502. The energy account is a balance account (e.g., a stored value account) or a credit account, or combinations thereof. At operation 504, an energy account identifier is associated with the energy account.

An energy card may be associated with the energy account identifier at operation 506. At operation 508, a payment request is received for providing an electric charge to the vehicle 102. In some embodiments, the payment request includes the energy account identifier.

Verification that the energy account is associated with the vehicle 102 is performed at operation 510. In some embodiments, funds are received for the energy account at operation 512.

At operation 514, a value of the energy account is adjusted. The value may be adjusted based a number of facts including receipt the charge request, receipt of the funds, a vehicle type of the vehicle, or a power basis of the vehicle. The value may be a stored value on the card, stored in the database 118 (FIG. 1), or both.

In some embodiments, the adjustment of the value based on vehicle type enables different types (e.g., make, model, or brand) of the vehicle 102 to be assessed at different rates. In other embodiments, the adjustment of the value based on the power basis may enable a different assessment based on, for example, the number of amps per hour or the number of volts per hour.

The value of the energy account, in some embodiments is stored on the energy card at operation 516. When stored value is used, the value of the energy account is adjusted by the value adjustment performed at operation 514.

Figure 6:
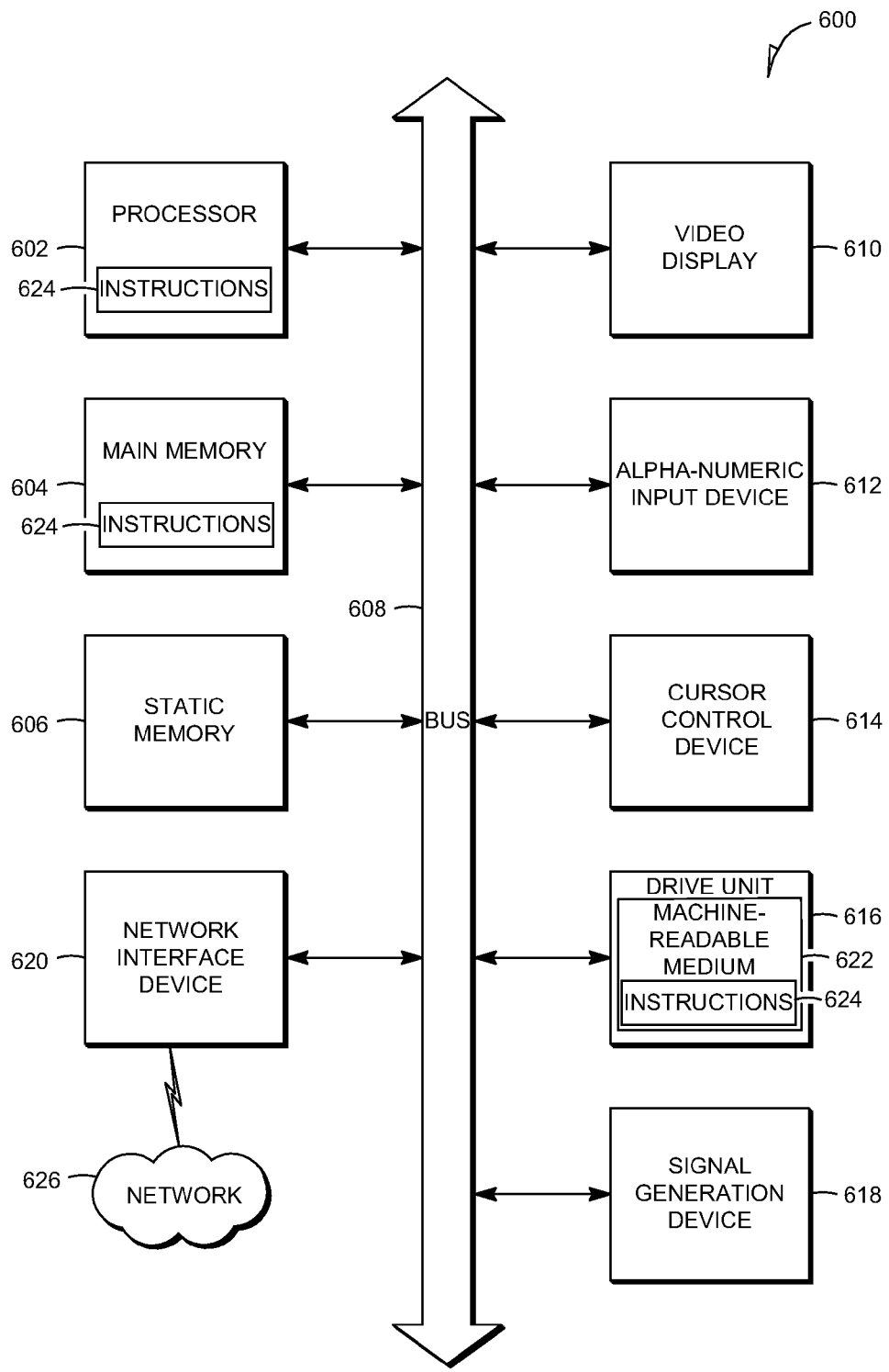
FIG. 6 is a block diagram of a machine in an exemplary form of a computer system within which a set of instructions for causing the machine to perform any one or more of the methodologies discussed herein may be executed.

FIG. 6 shows a block diagram of a machine in an exemplary form of a computer system 600 within which a set of instructions may be executed causing the machine to perform any one or more of the methods, processes, operations, or methodologies discussed herein. The provider 112 (see FIG. 1) may operate on one or more versions of the computer system 600. The payment station 110 or the energy station 106 may include the functionality of the one or more versions of the computer system 600.

In an exemplary embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, a kiosk, a point of sale (POS) device, a cash register, an Automated Teller Machine (ATM), or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processor 602 (e.g., a central processing unit (CPU) a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a cursor control device 614 (e.g., a mouse), a drive unit 616, a signal generation device 618 (e.g., a speaker), and a network interface device 620.

The drive unit 616 includes a machine-readable medium 622 on which is stored one or more sets of instructions 624 (e.g., software, firmware, or hardware-based) embodying any one or more of the methodologies or functions described herein. The instructions 624 may also reside, completely or at least partially, within the main memory 604 or within the processor 602 during execution thereof by the computer system 600, the main memory 604 and the processor 602 also constituting machine-readable media. The instructions 624 may further be transmitted or received over a network 626 via the network interface device 620.

While the machine-readable medium 622 is shown in an exemplary embodiment to be a single medium, the term "machine-readable medium" should be taken to include a single medium or multiple media (e.g., a centralized or distributed database, or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present invention. The term "machine-readable medium" shall accordingly be taken to include, but not be limited to, solid-state memories, and optical media, and magnetic media.

Certain systems, apparatus, applications, or processes are described herein as including a number of modules. A module may be a unit of distinct functionality that may be presented in software, hardware, or combinations thereof. When the functionality of a module is performed in any part through software, the module can include a machine readable medium. The modules may be regarded as being communicatively coupled.

The inventive subject matter described herein may be represented in a variety of different embodiments of which there are many possible permutations. For example, in an exemplary embodiment, a charge request may be received for a vehicle located in a parking area. The vehicle may have a power connection with a power source. An electric charge is provided through the power connection from the power source to the vehicle based on receiving the charge request. Payment is recorded for providing the electric charge based upon departure of the vehicle from the parking area.

In another exemplary embodiment, an energy account may be established for a user. An energy account identifier may be associated with the energy account. A payment request may be received for providing energy to a vehicle. The payment request may include the energy account identifier. Verification that the energy account is associated with the vehicle is performed. A value of the energy account may be adjusted based on receiving the charge request.

Thus, methods and systems for charging vehicles in a parking area have been described. Although embodiments of the present invention have been described with reference to specific exemplary embodiments, it will be evident that various modifications and changes may be made to these embodiments without departing from the broader spirit and scope of the various embodiments of the invention. Accordingly, the specification and drawings are to be regarded in an illustrative rather than a restrictive sense.

It should be noted that the methods described herein do not have to be executed in the order described, or in any particular order. Moreover, various activities described with respect to the methods identified herein can be executed in serial or parallel fashion. Further, it will be understood that although "End" blocks are shown in the flowcharts, the methods may be performed continuously.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus the following claims are hereby incorporated into the Detailed Description, with each claim standing on its own as a separate embodiment.

What is claimed is:

1. A method comprising:
    using one or more processors to perform at least some portion of the following:
        establishing an energy account associated with a user;
        associating an energy account identifier with the energy account;
        receiving a payment request to provide an electric charge to a vehicle, the payment request including the energy account identifier;
        verifying that the energy account is associated with the vehicle; and
        adjusting a value of the energy account based on the receiving of the payment request to provide the electric charge, on the verifying that the energy account is associated with the vehicle, and on a power basis of the vehicle, the adjustment on the power basis enabling a different assessment of value based on the power basis of the vehicle.

2. The method of claim 1, further comprising receiving funds for the energy account, wherein the adjusting of the energy account is based on the receiving of the payment request to provide the electric charge, the verifying, and the receiving of the funds.

3. The method of claim 1, further comprising associating an energy card with the energy account identifier.

4. The method of claim 1, further comprising storing the value of the energy account on an energy card.

5. The method of claim 1, wherein the adjusting of the value comprises adjusting the value of the energy account based on the receiving of the payment request to provide the electric charge, the verifying, and a vehicle type of the vehicle.

6. The method of claim 1, wherein the energy account is a balance account, a credit account, or combinations thereof.

7. A method comprising:
    using one or more processors to perform at least some portion of the following:
        establishing an energy account associated with a user;
        associating an energy account identifier with the energy account;
        receiving a payment request to provide an electric charge to a vehicle, the payment request including the energy account identifier;
        verifying that the energy account is associated with the vehicle; and
        adjusting a value of the energy account based on a power basis of the vehicle, the adjustment on the power basis enabling a different assessment of value based on the power basis of the vehicle.

8. A machine-readable storage device having embedded therein a set of instructions which, when executed by a machine, causes execution of the following operations:

establishing an energy account associated with a user;

associating an energy account identifier with the energy account;

receiving a payment request to provide an electric charge to a vehicle, the payment request including the energy account identifier;

verifying that the energy account is associated with the vehicle; and adjusting a value of the energy account based on a power basis of the vehicle, the adjustment on the power basis enabling a different assessment of value based on the power basis of the vehicle.

9. The machine-readable storage device of claim 8, the operations further comprising receiving funds for the energy account, wherein the adjusting of the energy account is based on the receiving of the payment request to provide the electric charge, the verifying, and the receiving of the funds.

10. The machine-readable storage device of claim 8, the operations further comprising associating an energy card with the energy account identifier.

11. The machine-readable storage device of claim 8, the operations further comprising storing the value of the energy account on an energy card.

12. The machine-readable storage device of claim 8, wherein the adjusting of the value comprises adjusting the value of the energy account based on the receiving of the payment request to provide the electric charge, the verifying, and a vehicle type of the vehicle.

13. The machine-readable storage device of claim 8, wherein the energy account is a balance account, a credit account, or combinations thereof.

* * * * *